(12) United States Patent
Jiang et al.

(10) Patent No.: US 9,483,145 B2
(45) Date of Patent: Nov. 1, 2016

(54) TOUCH PANEL AND A MANUFACTURING METHOD THEREOF

(75) Inventors: Yau-Chen Jiang, Zhubei (TW); Defa Wu, Jinjiang (CN); Yanjun Xie, Wuhan (CN); Jianbin Yan, Putian (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 137 days.

(21) Appl. No.: 13/545,986

(22) Filed: Jul. 11, 2012

(65) Prior Publication Data

US 2013/0176234 A1 Jul. 11, 2013

(30) Foreign Application Priority Data

Jan. 6, 2012 (CN) .......................... 2012 1 0009306

(51) Int. Cl.
*G06F 3/044* (2006.01)
(52) U.S. Cl.
CPC ...... *G06F 3/044* (2013.01); *G06F 2203/04111* (2013.01); *Y10T 29/49117* (2015.01)
(58) Field of Classification Search
CPC combination set(s) only.
See application file for complete search history.

(56) References Cited

U.S. PATENT DOCUMENTS

| | | |
|---|---|---|
| 2008/0309633 A1 | 12/2008 | Hotelling et al. |
| 2009/0231301 A1 | 9/2009 | Chang et al. |
| 2009/0236151 A1 | 9/2009 | Yeh et al. |
| 2010/0182253 A1* | 7/2010 | Park et al. ..................... 345/173 |
| 2010/0295814 A1 | 11/2010 | Kent et al. |
| 2011/0193801 A1 | 8/2011 | Jung et al. |
| 2012/0062515 A1* | 3/2012 | Teng ....................... G06F 3/044 345/174 |
| 2012/0182230 A1* | 7/2012 | Wang et al. .................. 345/173 |

FOREIGN PATENT DOCUMENTS

| | | |
|---|---|---|
| CN | 102081477 A | 6/2011 |
| TW | M397553 U | 2/2011 |
| TW | 201120717 | 6/2011 |
| TW | 442544 | 12/2012 |

* cited by examiner

*Primary Examiner* — Amr Awad
*Assistant Examiner* — Andre Matthews
(74) *Attorney, Agent, or Firm* — Cooper Legal Group, LLC

(57) ABSTRACT

The present disclosure relates to a touch technology and more particularly, to a touch panel and a manufacturing method thereof. The touch panel comprises a plurality of first sensing electrode axes, a plurality of second sensing electrode axes, and a plurality of conductive wire axes. The first sensing electrode axes are disposed along a first axis. The second sensing electrode axes are disposed along a second axis and electrically insulated from the first sensing electrode axes. The plurality of conductive wire axes are disposed along the second axis and extended to the first peripheral area. Any two of the conductive wire axes are electrically connected to different first sensing electrode axes. According to the touch panel and the manufacturing method provided in the present disclosure, areas of the available touch area and a visible area on the touch panel can be effectively increased.

27 Claims, 14 Drawing Sheets

TOUCH PANEL AND A MANUFACTURING METHOD THEREOF

BACKGROUND OF THE INVENTION

This Application claims the benefit of the People's Republic of China Application No. 201210009306.4, filed on Jan. 6, 2012.

1 Field of the Invention

The present disclosure relates to touch technology. More particularly, the present disclosure relates to a touch panel and a manufacturing method thereof.

2 Description of the Related Art

In recent years, electronic devices such as mobile phones, laptops and palmtops are widely used with a touch display screen, wherein the touch display screen disposed on the electronic devices acts both as an input and output interface. A user can control the electronic device with the help of the touch display screen and control functions of the electronic device correspondingly.

Generally, the touch display screen displays image information on the display screen or performs a preset function according to a touch location sensed by the touch panel. Touch input modes of conventional touch panels include resistive mode, capacitive mode, optical mode, electromagnetic induction mode and acoustic-wave sensitive mode, wherein capacitive mode is the most common touch panel technology in the market.

FIG. 1 is a schematic structure view of a conventional touch panel. For a conventional touch panel, a plurality of conductive sensing circuits are formed on a touch area 10, forming sensing electrode axes X0~X4 along X direction and sensing electrode axes Y0~Y7 along Y direction in FIG. 1. Then, peripheral leads 11 and 13 are formed in a peripheral area 12 to connect the sensing electrode axes along the X direction, the sensing electrode axes along the Y direction, and back-end detection circuits respectively, thereby transmitting touch information sensed by the sensing electrode axes along the X direction and the sensing electrode axes along the Y direction to the back-end detection circuits. Thus, the back-end detection circuits determine an exact touch location according to touch information received, such as a touch point 15 shown in FIG. 1.

As shown in FIG. 1, the peripheral leads 11 that connect the sensing electrode axes along the X direction are usually disposed in the peripheral area at left side of the touch area, and the peripheral leads 13 that connect the sensing electrode axes along the Y direction are usually disposed in the peripheral area at lower side of the touch area. With regard to this design, space should be reserved in the peripheral area at the lower side and the left side of the touch area for disposition of the peripheral leads 11 and 13. Meanwhile, in order that the touch area 10 does not deviate too much from the central position due to the space reservation, space should also be reserved in the peripheral area at an upper side and right side of the touch area for balancing position of the touch area, though there are no peripheral leads disposed in the peripheral area at the upper side and right side of the touch area. However, if a designer would like to reduce size of a peripheral area of a touch panel, for example, to maximize size of the available touch area, the conventional design of a touch panel can not meet the requirement.

SUMMARY OF THE DISCLOSURE

The present disclosure provides a touch panel and a manufacturing method thereof. The touch panel comprises a plurality of conductive wire axes disposed on a touch area along a second axis and extended to a first peripheral area, wherein the plurality of conductive wire axes lead out peripheral leads of first sensing electrode axes along the second axis such that the peripheral leads that connect the first sensing electrode axes and peripheral leads that connect second sensing electrode axes are centralized at one side of the touch area, thereby reducing area of the peripheral area of the touch panel and effectively increasing area of the available touch area and increasing visible area on the touch panel.

An embodiment of the present disclosure provides a touch panel having a touch area and a first peripheral area, wherein the touch panel comprises: a plurality of first sensing electrode axes disposed on the touch area along a first axis; a plurality of second sensing electrode axes disposed on the touch area along a second axis and electrically insulated from the first sensing electrode axes; and a plurality of conductive wire axes disposed on the touch area along the second axis and extended to the first peripheral area, wherein any two of the conductive wire axes are electrically connected to different first sensing electrode axes, and wherein the first peripheral area is located at a first side of the touch area.

An embodiment of the present disclosure further provides a method for manufacturing a touch panel. The touch panel has a touch area and a first peripheral area. The method comprises the steps of: forming a plurality of first sensing electrode axes and a plurality of second sensing electrode axes on the touch area, wherein the first sensing electrode axes are disposed along a first axis and the second sensing electrode axes are disposed along a second axis, and wherein the first sensing electrode axes are electrically insulated from the second sensing electrode axes; and forming a plurality of conductive wire axes, wherein the conductive wire axes are disposed on the touch area along the second axis and are extended to the first peripheral area, wherein any two of the conductive wire axes are electrically connected to different first sensing electrode axes, and wherein the first peripheral area is located at a first side of the touch area.

To sum up, for a touch panel and a manufacturing method provided in the embodiments of the present disclosure, a plurality of conductive wire axes are disposed on a touch area along a second axis and are extended to a first peripheral area, wherein the plurality of conductive wire axes lead out peripheral leads of first sensing electrode axes along the second axis such that the peripheral leads that connect the first sensing electrode axes and peripheral leads that connect second sensing electrode axes are concentrated in the first peripheral area, thereby reducing area of the peripheral area of the touch panel and effectively increasing areas of the available touch area and a visible area on the touch panel.

BRIEF DESCRIPTION OF THE DRAWINGS

For those skilled in the art to understand the present disclosure, numerous embodiments are described below, annexing drawings to minutely illustrate the matters of the present disclosure and the purpose thereof.

DETAILED DESCRIPTION OF THE EMBODIMENTS

Figure 1:
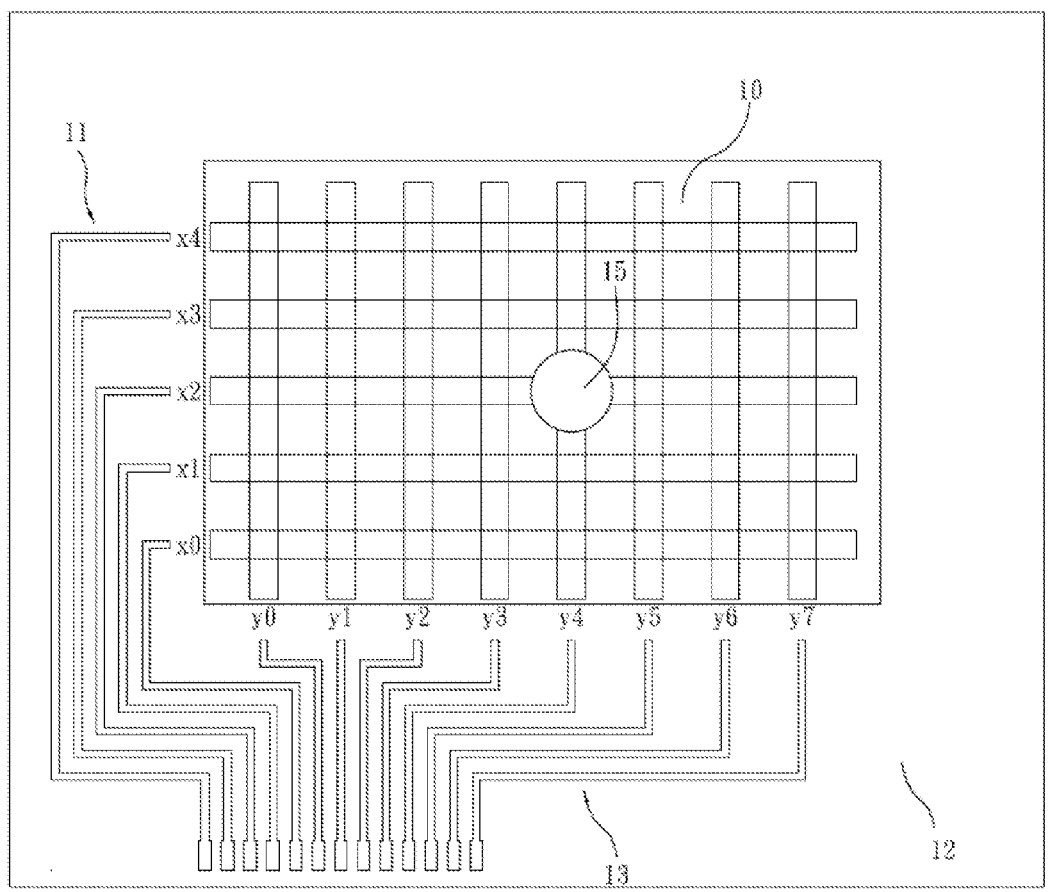
FIG. 1 is a schematic structure view of a conventional touch panel.
Figure 2:
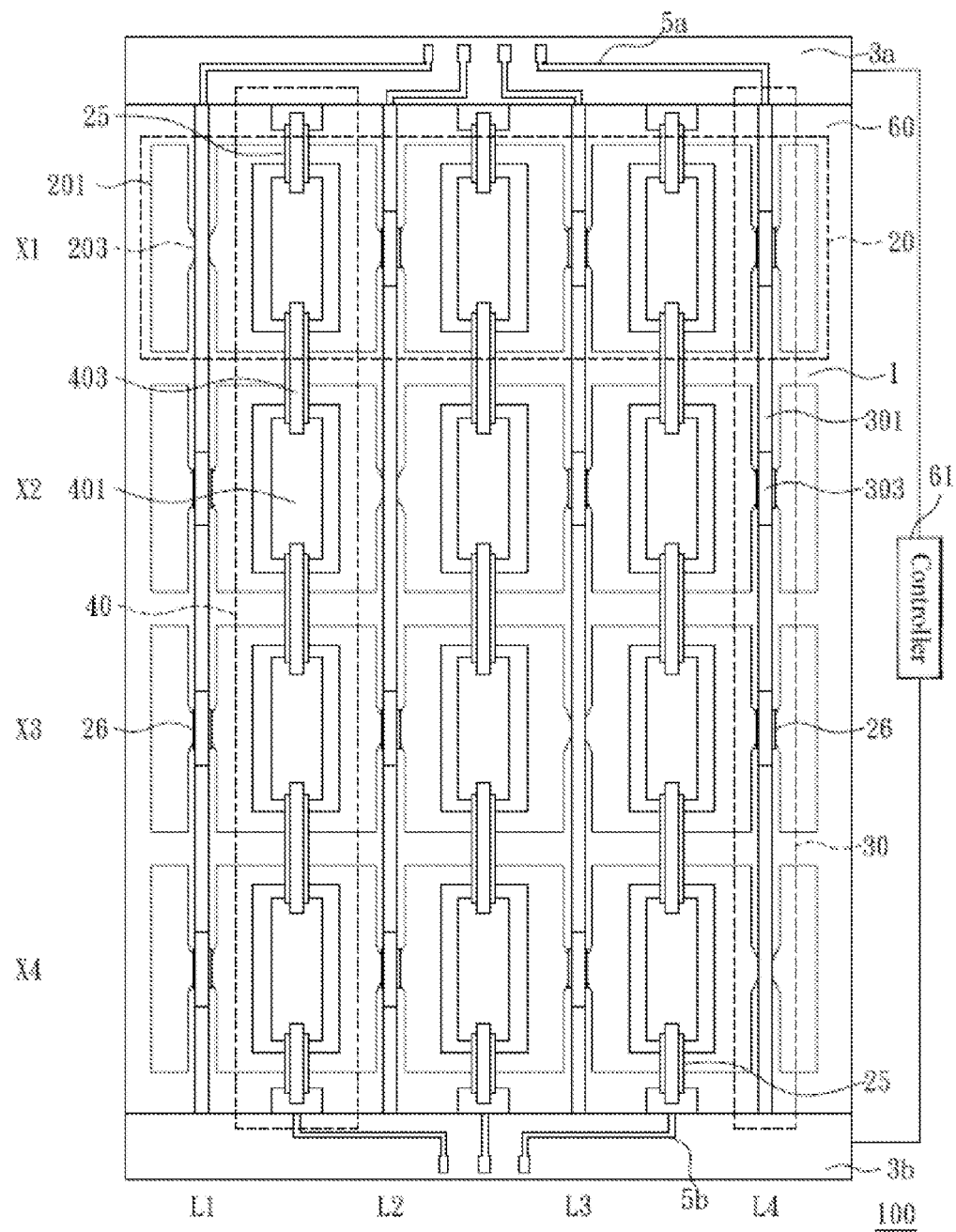
FIG. 2 is a schematic structure view of a touch panel in accordance with a first embodiment of the present disclosure.

FIG. 2 is a schematic structure view of a touch panel in accordance with a first embodiment of the present disclosure. A touch panel 100 has a touch area 1 and a first peripheral area 3a. The touch panel 100 comprises a plurality of first sensing electrode axes 20, a plurality of second sensing electrode axes 40, and a plurality of conductive wire axes 30. The first sensing electrode axes 20 and the second sensing electrode axes 40 are disposed on the touch area 1 along a first axis and a second axis respectively. The first sensing electrode axes 20 are electrically insulated from the second sensing electrode axes 40. The conductive wire axes 30 are disposed on the touch area 1 along the second axis and are extended to the first peripheral area 3a, wherein any two of the conductive wire axes 30 are electrically connected to different first sensing electrode axes 20, and wherein the first peripheral area 3a is located at a first side of the touch area 1.

Specifically, in the present embodiment, each of the first sensing electrode axes 20 comprises a plurality of first electrodes 201 disposed along the first axis (such as X axis) in an equally spaced manner, wherein the first electrodes 201 are electrically connected by a plurality of first conductive wires 203. The plurality of first sensing electrode axes 20 are mutually spaced and paralleled in a matrix manner.

Similarly, each of the second sensing electrode axes 40 comprises a plurality of second electrodes 401 disposed along the second axis (such as Y axis) in an equally spaced manner, wherein the second electrodes 401 are electrically connected by a plurality of second conductive wires 403. The plurality of second sensing electrode axes 40 are mutually spaced and paralleled in a matrix manner.

In the present embodiment, the first axis is perpendicular to the second axis, the first electrodes 201 and the second electrodes 401 are arranged in a staggered manner. Further, each of the first electrodes 201 has an opening, and each of the second electrodes 401 is disposed in the opening. The first electrodes 201 surround the second electrodes 401, and are spaced from the second electrodes 401 such that the first electrodes 201 are electrically insulated from the second electrodes 401.

Moreover, the conductive wire axes 30 and the first sensing electrode axes 20 are arranged in a staggered manner, and each of the conductive wire axes 30 is disposed between the adjacent second sensing electrode axes 40 along the second axis. Each of the conductive wire axes 30 is used to lead out a sensing signal in one of the first sensing electrode axes 20 along the second axis. Specifically, there are a plurality of intersections between the two axes of the conductive wire axes 30 and the first sensing electrode axes 20. Each of the conductive wire axes 30 and one of the first sensing electrode axes 20 are electrically connected at one of the intersections as a contact point and are electrically insulated at other intersections as insulation points. Axial coordinates of the contact points are not repeated. Thus, sensing signals in the plurality of paralleled first sensing electrode axes 20 do not interfere with each other, thereby not affecting detection and determination of the sensing signals.

In a specific embodiment, as shown in FIG. 2, each of the conductive wire axes 30 comprises a plurality of conductive wire segments 301, wherein the conductive wire segments 301 are electrically connected by a plurality of third conductive wires 303, and wherein each of the conductive wire axes 30 is electrically connected with the first conductive wire 203 at the contact point by one of the conductive wire segments 301. In order to make the first sensing electrode axes 20 electrically insulated from the second sensing electrode axes 40 and make the first sensing electrode axes 20 electrically connected with the conductive wire axes 30 only at the contact points, the touch panel 100 further comprises a plurality of first insulation blocks 25 and a plurality of second insulation blocks 26.

The first insulation blocks 25 are disposed between the first electrodes 201 and the second conductive wires 403 respectively. In other words, the first insulation blocks 25 are disposed on the first electrodes 201, and the second conductive wires 403 stretch across the first insulation blocks 25 such that the adjacent second electrodes 401 are electrically conducted by the second conductive wires 403 and the first sensing electrode axes 20 are electrically insulated from the second sensing electrode axes 40 by the first insulation blocks 25.

The second insulation blocks 26 are disposed between the first conductive wires 203 and the third conductive wires 303 at the insulation points respectively such that the conductive wire axes 30 electrically connect the first conductive wires 203 in corresponding first sensing electrode axes 20 in a discontinuous manner.

For example, as shown in FIG. 2, the first sensing electrode axes 20 are marked as X1~X4 from up to down respectively, and the conductive wire axes 30 are marked as L1~L4 from left to right respectively. L1 and the first conductive wire 203 of X1 at the intersection are electrically connected as a contact point while L1 and the first conductive wires 203 of X2, X3 and X4 are electrically insulated as insulation points. L2 and the first conductive wire 203 of X2 at the intersection are electrically connected as a contact point while L2 and the first conductive wires 203 of X1, X3 and X4 are electrically insulated as insulation points. Similarly, L3 and the first conductive wire 203 of X3 at the intersection are electrically connected as a contact point while L3 and the first conductive wires 203 of X1, X2 and X4 are electrically insulated as insulation points. L4 and the first conductive wire 203 of X4 at the intersection are electrically connected as a contact point while LA and the first conductive wires 203 of X1, X2 and X3 are electrically insulated as insulation points. Accordingly, sensing signals in X1, X2, X3 and X4 can be transmitted by L1, L2, L3 and L4 respectively along the second axis.

In the above embodiment, the touch panel 100 can further have a second peripheral area 3b, wherein the second peripheral area 3b is located at a second side opposite to the first peripheral area 3a of the first side of the touch area 1, and wherein the conductive wire axes 30 are extended to the second peripheral area 3b. Compared with the touch area 1, the first peripheral area 3a and the second peripheral area 3b can be opaque areas, upon which opaque printing ink can be printed to delimit a border of the touch panel and form a trademark, an icon and/or other special patterns thereupon. First peripheral leads 5a are disposed on the first peripheral area 3a and are electrically connected to the conductive wire axes 30. Second peripheral leads 5b are disposed on the second peripheral area 3b and are electrically connected to the second sensing electrode axes 40, but it is not limited thereto. In another embodiment, a first peripheral area 3a and second peripheral leads 5b can electrically connect conductive wire axes 30 and second sensing electrode axes 40 respectively.

The touch panel 100 provided in the embodiment of the present disclosure can further comprise a substrate 60 and a controller 61, wherein the substrate 60 is a transparent substrate, upon which the touch area 1 and the first peripheral area 3a and/or the second peripheral area 3b are delimited. The conductive wire axes 30, the first electrodes 201, the first conductive wires 203, the second electrodes 401, and the second conductive wires 403 are disposed at the same side of the substrate 60. The controller 61 is electrically connected with the first peripheral leads 5a and the second peripheral leads 5b respectively. When the touch panel 100 is operated, the first peripheral leads 5a and the second peripheral leads 5b respectively transmit sensing signals (such as capacitance change or voltage change generated according to a touch operation) from the first sensing electrode axes 20 and the second sensing electrode axes 40 to the controller 61. After the controller 61 processes the sensing signals received, an exact touch location is determined.

However, structure of the above touch panel is not used to limit the present disclosure. In other embodiments, first sensing electrode axes 20, second sensing electrode axes 40, and conductive wire axes 30 can also be disposed at different sides of a substrate 60.

Figure 3:
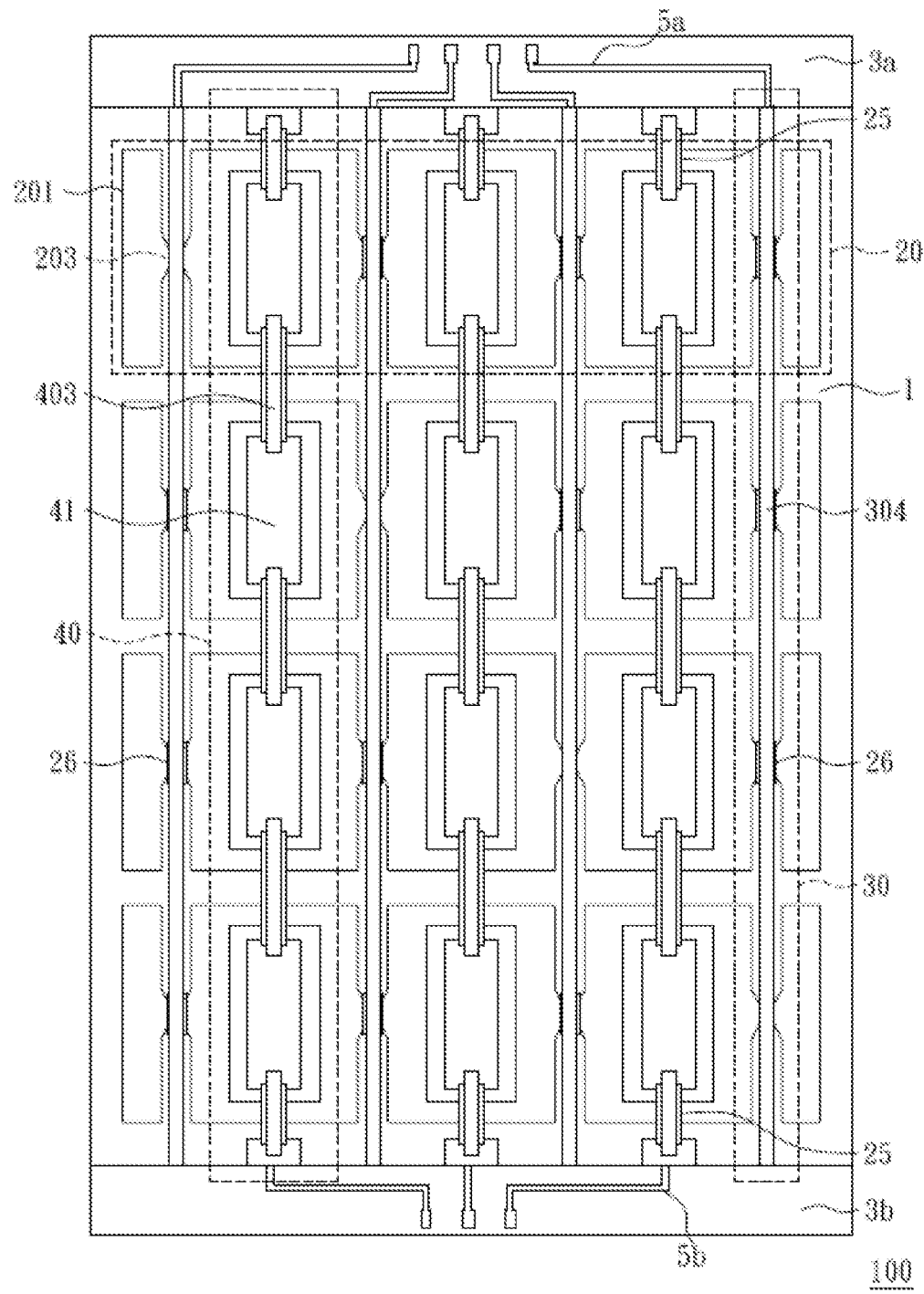
FIG. 3 is a schematic structure view of a touch panel in accordance with a second embodiment of the present disclosure.

FIG. 3 is a schematic structure view of a touch panel in accordance with a second embodiment of the present disclosure. Difference between the present embodiment and the first embodiment at least lies in that: in the present embodiment, conductive wire axes 30 are continuous conductive wire axes 304; second insulation blocks 26 are respectively disposed between the continuous conductive wire axes 304 and first conductive wires 203 at insulation points such that different continuous conductive wire axes 304 are electrically connected with one of the first conductive wires 203 of each first sensing electrode axis 20 only at a corresponding contact point respectively and are electrically insulated from the first conductive wires 203 of each first sensing electrode axis 20 at the insulation points. Accordingly, any two of the continuous conductive wire axes 304 are electrically connected to different first sensing electrode axes 20. Other elements of the present embodiment are identical to those shown in FIG. 2; thus, no more description is made herein.

Figure 4:
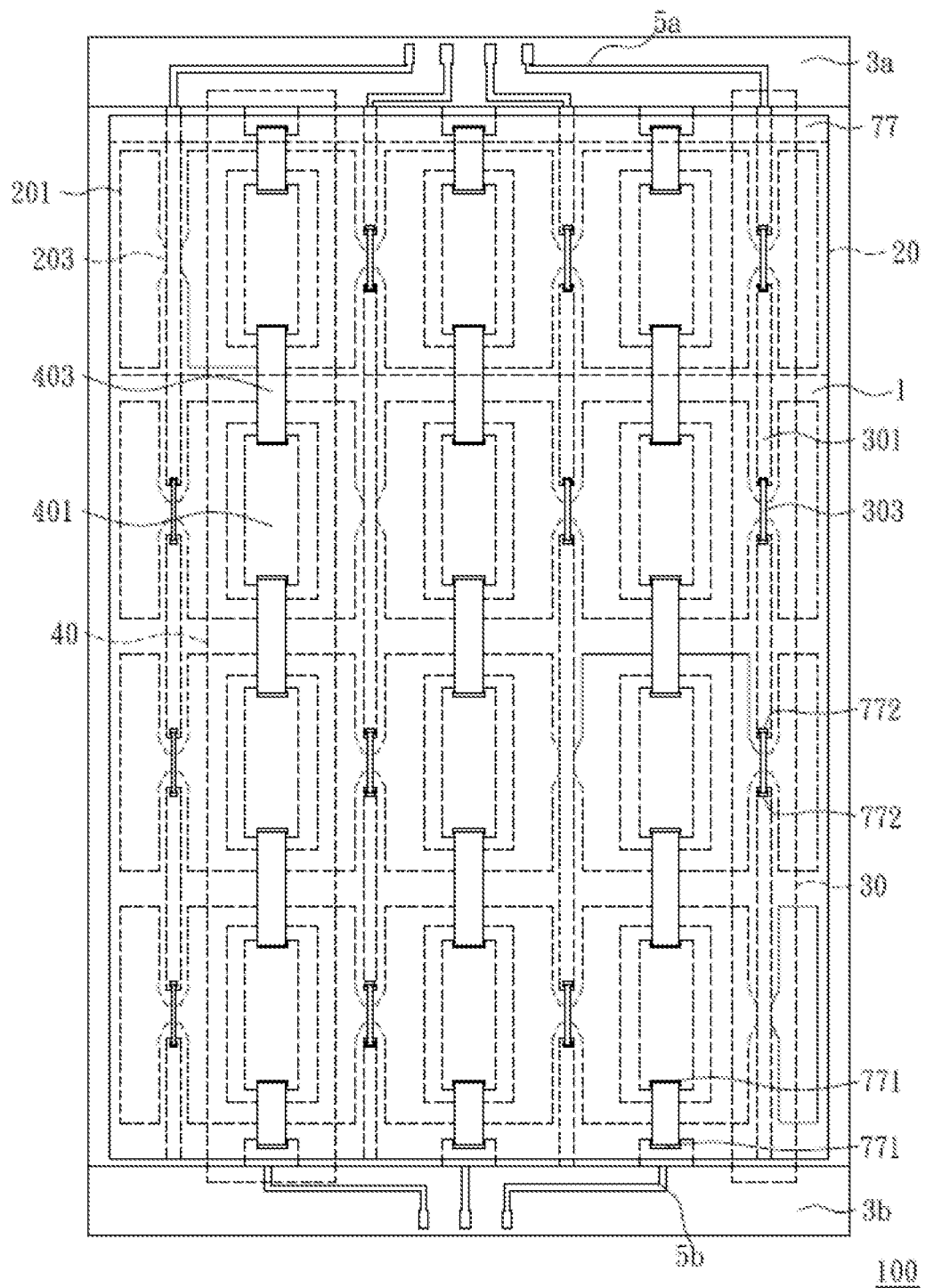
FIG. 4 is a schematic structure view of a touch panel in accordance with a third embodiment of the present disclosure.

FIG. 4 is a schematic structure view of a touch panel in accordance with a third embodiment of the present disclosure. Difference between the present embodiment and the first embodiment at least lies in that: a whole insulation layer 77 replaces first insulation blocks 25 and second insulation blocks 26 of the first embodiment, wherein first sensing electrode axes 20 are electrically insulated from second sensing electrode axes 40 by the insulation layer 77. Specifically, the insulation layer 77 is disposed on first electrodes 201, first conductive wires 203, second electrodes 401, and conductive wire segments 301. There are a plurality of first through-holes 771 and a plurality of second through-holes 772 on the surface of the insulation layer 77, wherein the first through-holes 771 respectively correspond to the adjacent second electrodes 401 and the second through-holes 772 respectively correspond to the adjacent conductive wire segments 301. Each of second conductive wires 403 is disposed on the insulation layer 77 and passes through the adjacent first through-holes 771 to electrically connect the adjacent second electrodes 401. Each of third conductive wires 303 is disposed on the insulation layer 77 and passes through the adjacent second through-holes 772 to electrically connect the adjacent conductive wire segments 301. Other elements of the present embodiment are identical to those shown in FIG. 2; thus, no more description is made herein.

Figure 5:
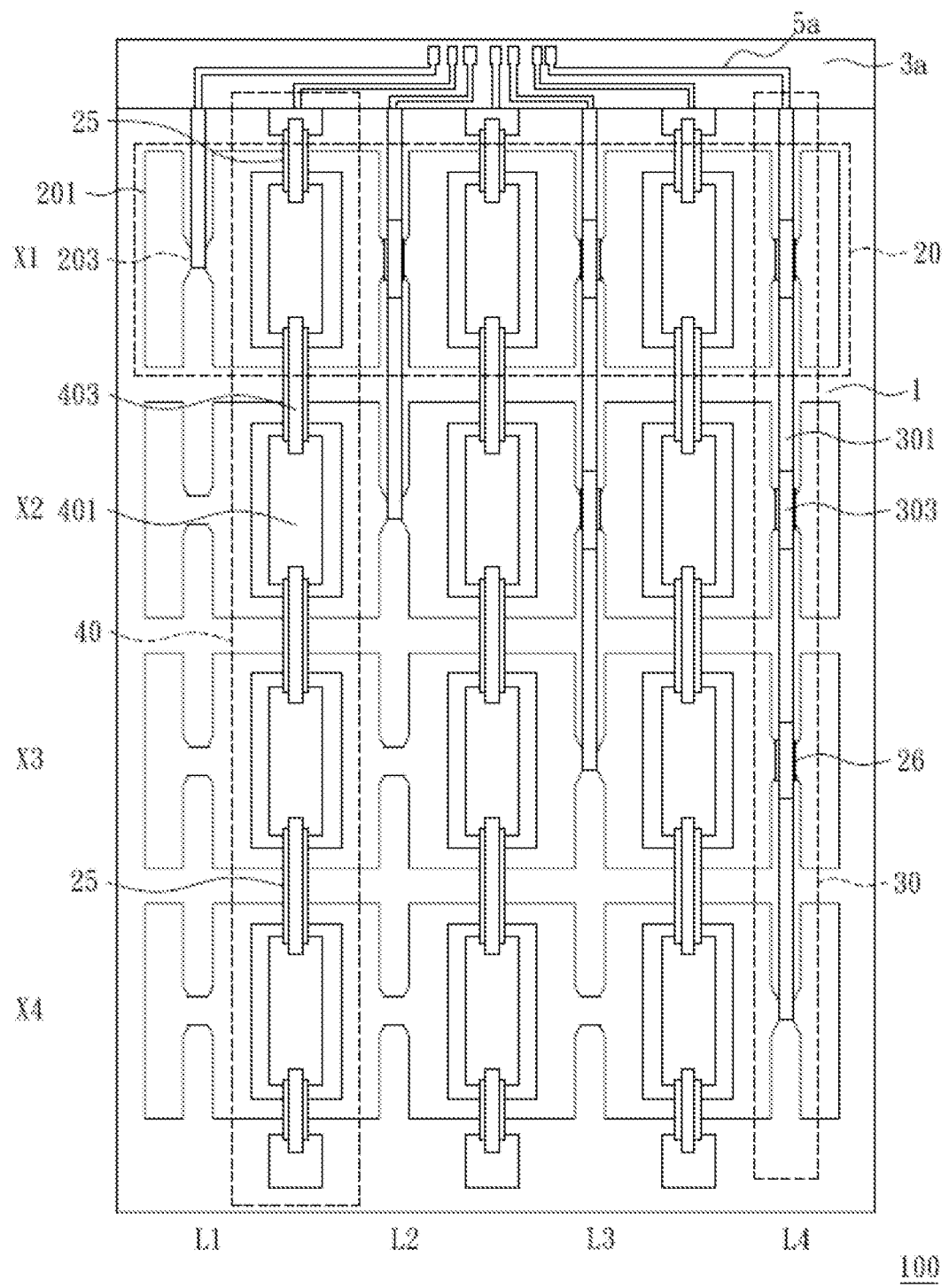
FIG. 5 is a schematic structure view of a touch panel in accordance with a fourth embodiment of the present disclosure.

FIG. 5 is a schematic structure view of a touch panel in accordance with a fourth embodiment of the present disclosure. Difference between the present embodiment and the first embodiment at least lies in that: conductive wire axes 30 designed in the present embodiment are different in length. For example, according to an arrangement order from left to right, conductive wire axes 30 can be designed from short to long, wherein each of the conductive wire axes 30 and one of first sensing electrode axes 20 are electrically connected at one intersection as a contact point but are electrically insulated at other intersections as insulation points or do not intersect at all.

For example, as shown in FIG. 5, the first sensing electrode axes 20 are marked as X1~X4 from up to down respectively, and the conductive wire axes 30 are marked as L1~L4 from left to right respectively. L1 and first conductive wire 203 of X1 at the intersection are electrically connected as a contact point while L1 and the first conductive wires 203 of X2, X3 and X4 do not intersect at all. L2 and the first conductive wire 203 of X2 at the intersection are electrically connected as a contact point while L2 and the first conductive wire 203 of X1 are electrically insulated as an insulation point and L2 does not intersect with the first conductive wires 203 of X3 and X4 at all. L3 and the first conductive wire 203 of X3 at the intersection are electrically connected as a contact point while L3 and the first conductive wires 203 of X1 and X2 are electrically insulated as insulation points and L3 does not intersect with the first conductive wire 203 of X4 at all. IA and the first conductive wire 203 of X4 at the intersection are electrically connected as a contact point while LA and the first conductive wires 203 of X1, X2 and X3 are electrically insulated as insulation points. Thus, the conductive wire axes 30 only need to be extended from the contact points to the first peripheral area 3a at a first side of the touch panel 100, thereby being able to leave out the second peripheral area 3b required in the first embodiment so as to expand scope of the touch area 1 and also being able to leave out the conductive wire segments 301 that are extended from the contact points to the second peripheral area 3b along the second axis and the corresponding third conductive wires 303 and second insulation blocks 26. Alternatively, in another embodiment, the conductive wire segments 301 that are extended from the contact points to the second side of the touch panel along the second axis can be retained but the third conductive wires 303 that are extended from the contact points to the second side of the touch panel 100 along the second axis and the corresponding second insulation blocks 26 are left out, thereby reducing difference of light reflectivity between the area disposed with electrodes and the area without electrodes and thus improving visual appearance of a product. Similarly in another design, only the second peripheral area 3*b* and the second peripheral leads 5*b* are disposed at the second side of the touch panel 100, while the first peripheral area 3*a* and the first peripheral leads 5*a* are not disposed. Therefore, the conductive wire axes 30 only need to be extended from the contact points that are electrically connected with the first sensing electrode axes 20 to the second peripheral area 3*b*, thereby being able to leave out the first peripheral area 3*a* required in the touch panel 100 so as to expand scope of the touch area and also being able to leave out the conductive wire segments 301 that are extended from the contact points to the first peripheral area 3*a* along the second axis and the corresponding third conductive wires 303 and second insulation blocks 26. Alternatively, in another embodiment, if there is only a second peripheral area 3*b*, the conductive wire segments 301 that are extended from the contact points to the first side of the touch panel 100 along the second axis can be retained, but the third conductive wires 303 that are extended from the contact points to the first side of the touch panel 100 along the second axis and the corresponding second insulation blocks 26 are left out, thereby reducing difference of light reflectivity between the area disposed with electrodes and the area without electrodes and thus improving visual appearance of a product.

Different from the above embodiments, in the present embodiment, the touch panel 100 only has a first peripheral area 3*a* and first peripheral leads 5*a* but does not have a second peripheral area 3*b* and second peripheral leads 3*b*, or vice versa. Using peripheral leads at only a side of the touch panel 100 can not only effectively reduce area of the peripheral area of the touch panel 100 and expand scope of the touch area but can also reduce production cost of the touch panel 100. Incidentally, the embodiment that only has a first peripheral area 3*a* and first peripheral leads 5*a* or only has a second peripheral area 3*b* and second peripheral leads 5*b* is also applicable to the touch panels in the above first to third embodiments. Further, the first peripheral leads 5*a* or the second peripheral leads 5*b* can be connected with a plurality of pins disposed on a flexible print circuit board (FPC) so as to electrically connect back-end detection circuits on the flexible print circuit board, thereby transmitting sensing signals to the back-end detection circuits for detection and determination.

In practical implementation, the first electrodes 201, the second electrodes 401, the first conductive wires 203 and the conductive wire segments 303 mentioned in the first to the fourth embodiments can be formed on the substrate 60 by circuit manufacturing processes of exposure, developing and etching. The substrate 60 can be made of glass, plastic or other transparent insulating materials. The first electrodes 201, the second electrodes 401 and the first conductive wires 203 can be made of transparent conductive materials, such as indium tin oxide (110), indium zinc oxide (IZO) or aluminum oxide. The second conductive wires 403, the third conductive wires 303, the first peripheral leads 5*a*, and the second peripheral leads 5*b* can be made of gold, silver, copper, aluminum or other metal materials, or made of transparent conductive materials such as indium tin oxide (ITO), indium zinc oxide (IZO) or aluminum oxide. The first insulation blocks 25 and the second insulation blocks 26 can be made of a transparent insulating material such as silicon oxide, epoxy resin or polyimide. The first insulation blocks 25 and the second insulation blocks 26 can also be made of an opaque material such as printing ink. According to the requirement of an actual circuit design, the first electrodes 201 and the second electrodes 401 can be polygon shaped such as square, rectangle, rhombus, triangle, hexagon or octagon. The first axis and the second axis are perpendicular to each other or at any angle according to the requirement of an actual wiring design only if the first electrodes 201 disposed along the first axis are electrically insulated from the second electrodes 401 disposed along the second axis and the purpose of touch detection is achieved.

To sum up, for the touch panel provided in the embodiments of the present disclosure, sensing signals of the first sensing electrode axes 20 can be transmitted to the first peripheral leads 5*a* or the second peripheral leads 5*b* through the conductive wire axes 30 while sensing signals of the second sensing electrode axes 40 can be directly transmitted to the first peripheral leads 5*a* such that the peripheral leads that connect the first sensing electrode axes 20 and the peripheral leads that connect the second sensing electrode axes 40 are concentrated in the first peripheral area 3*a* and/or the second peripheral area 3*b*, thereby reducing area of the peripheral area of the touch panel and effectively increasing areas of the available touch area and a visible area on the touch panel.

Incidentally, if the touch panel 100 is integrated with a display device, the second conductive wires 403, the conductive wire segments 301, the third conductive wires 303, the first peripheral leads 5*a*, and the second peripheral leads 5*b* disposed along the second axis can be overlapped with a light shielding layer arranged as a black matrix in the display device so as to improve light transmittance of the display device. Alternatively, the second conductive wires 403, the conductive wire axes 30, the third conductive wires 303, the first peripheral leads 5*a*, and the second peripheral leads 5*b* can replace the light shielding layer, thereby leaving out the shielding layer. Meanwhile, impedance of the second conductive wires 403, the conductive wire axes 30, the third conductive wires 303, the first peripheral leads 5*a* and the second peripheral leads 5*b* can be reduced, thereby improving sensitivity of signal transmission between the first sensing electrode axes 20 and the first peripheral leads 5*a* and between the second sensing electrode axes 40 and the second peripheral leads 5*b*.

The touch panel 100 provided in the above embodiments can be made by the following method, mainly comprising the steps of forming a plurality of first sensing electrode axes 20 and a plurality of second sensing electrode axes 40 on a touch area 1, wherein the first sensing electrode axes 20 are disposed along a first axis and the second sensing electrode axes 40 are disposed along a second axis, and wherein the first sensing electrode axes 20 are electrically insulated from the second sensing electrode axes 40; and forming a plurality of conductive wire axes 30, wherein the conductive wire axes 30 are disposed on the touch area 1 along the second axis and extended to a first peripheral area 3*a*, wherein any two of the conductive wire axes 30 are electrically connected to different first sensing electrode axes 20, and wherein the first peripheral area 3*a* is located at a first side of the touch area 1.

Each of the first sensing electrode axes 20 comprises a plurality of first electrodes 201. Each of the second sensing electrode axes 40 comprises a plurality of second electrodes 403. There are a plurality of intersections between two axes of the conductive wire axes 30 and the first sensing electrode axes 20. Each of the conductive wire axes 30 and one of the first sensing electrode axes 20 are electrically connected at one of the intersections as a contact point and are electrically insulated at other intersections as insulation points or do not intersect at all.

Besides, the touch panel 100 further has a second peripheral area 3b, wherein the second peripheral area 3b is located at a second side opposite to the first side of the touch area 1, and wherein the conductive wire axes 30 can be further extended to the second peripheral area 3b.

Methods for manufacturing the touch panels with different structures provided in the above embodiments are described in detail hereinafter.

FIGS. 6~10 are schematic views illustrating a method for manufacturing a touch panel in accordance with a first embodiment of the present disclosure. The manufacturing method in the present embodiment is used to form the touch panel 100 shown in FIG. 2 correspondingly.

Figure 6:
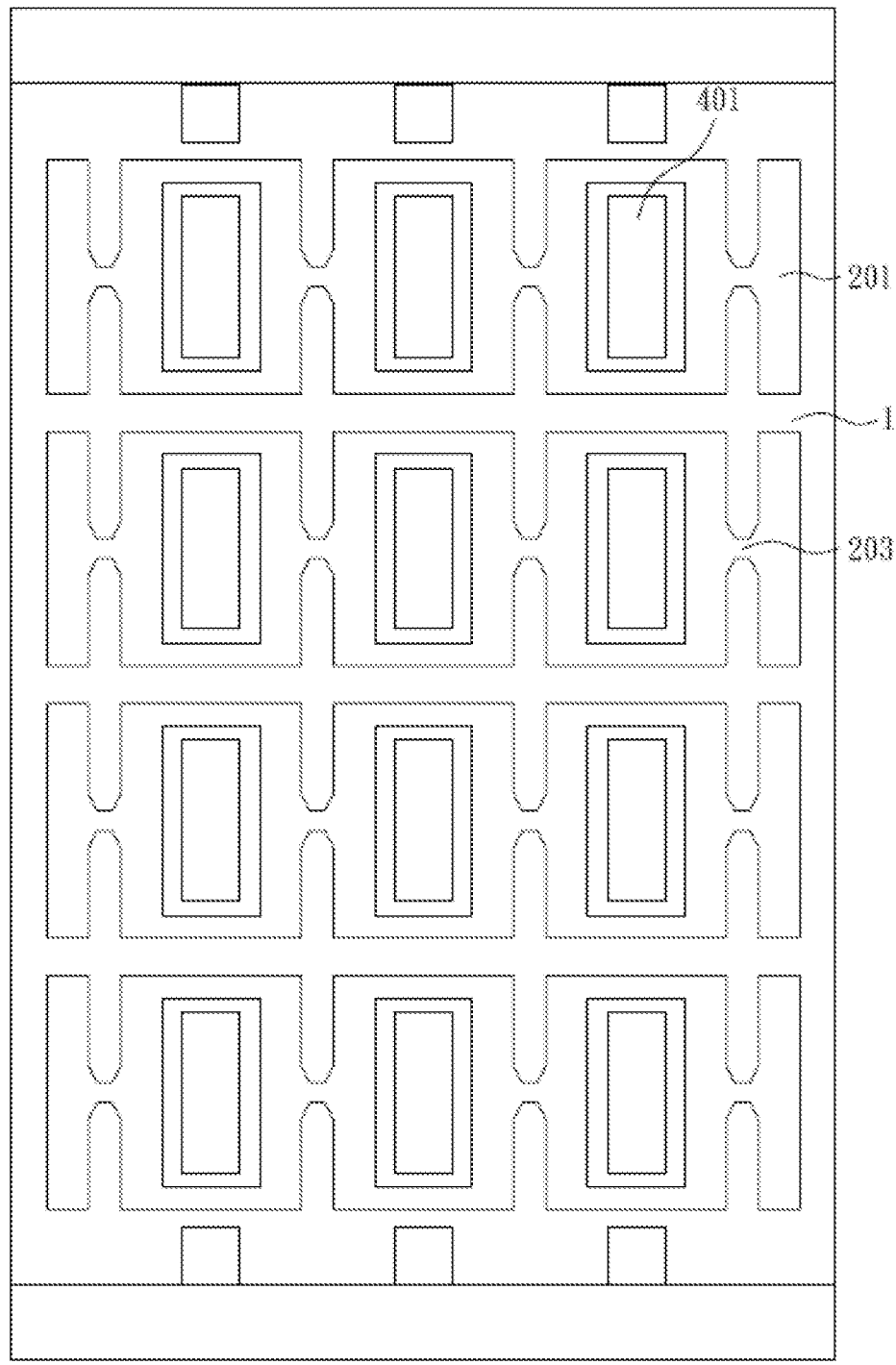
FIGS. 6~10 are schematic views illustrating a method for manufacturing a touch panel in accordance with a first embodiment of the present disclosure.

In a first manufacturing process, as shown in FIG. 6, first electrodes 201, first conductive wires 203, and second electrodes 401 are formed on the touch area 1, wherein the first electrodes 201 are mutually paralleled and spaced in a matrix manner along a first axis (such as X axis), and are electrically connected by the first conductive wires 203. The second electrodes 401 are mutually paralleled and spaced in a matrix manner along a second axis (such as Y axis). Each of the first electrodes 201 has an opening, and each of the second electrodes 401 is disposed in the opening. Specifically, each of the first electrodes 201 surrounds a second electrode 401, and is spaced from the second electrode 401 such that the first electrodes 201 are electrically insulated from the second electrodes 401. Besides, the first axis is perpendicular to the second axis; the first electrodes 201 and the second electrodes 401 are arranged in a staggered manner.

Figure 7:
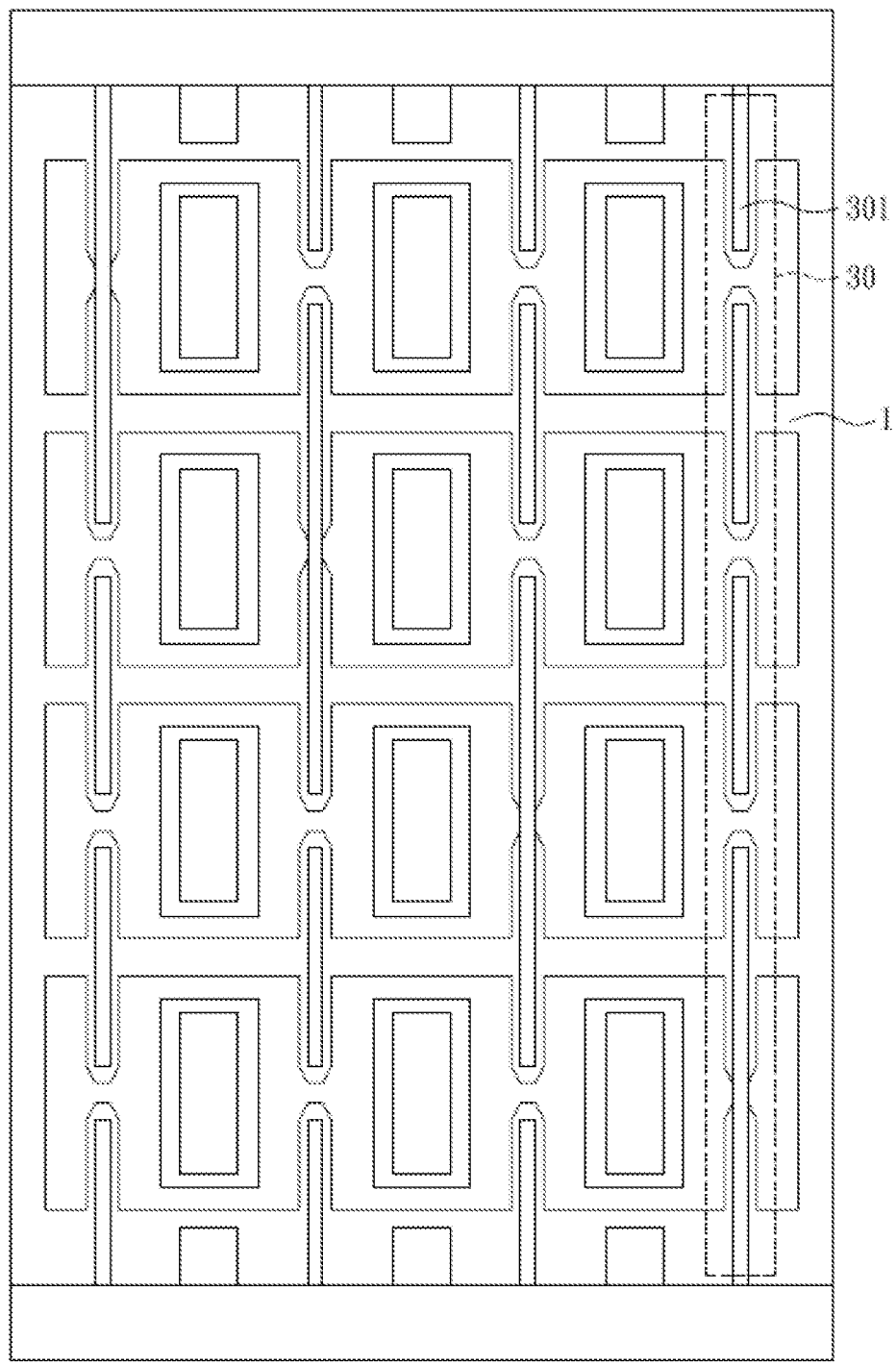
Figure 8:
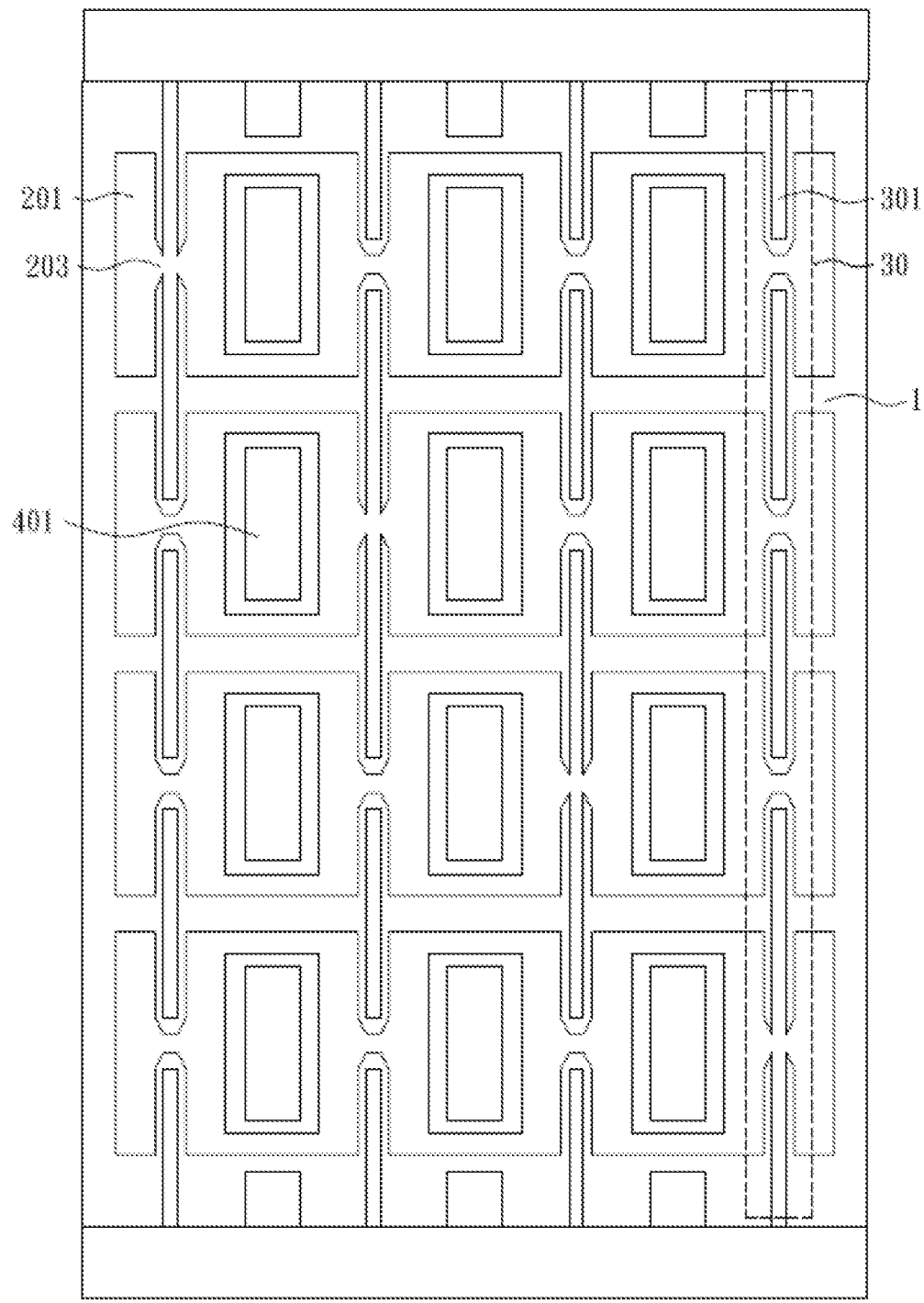

In a second manufacturing process, as shown in FIG. 7, a plurality of conductive wire segments 301 are formed, wherein each of conductive wire axes 30 is electrically connected with the first conductive wire 203 at a contact point by one of the conductive wire segments 301, and other conductive wire segments 301 are electrically insulated from other first conductive wires 203 of first sensing electrode axes 20 at insulation points. The conductive wire axes 30 are disposed along the second axis and are extended to a first peripheral area 3a and to a second peripheral area 3b. In another embodiment, the first and second manufacturing processes shown in FIG. 6 and FIG. 7 can be combined into one manufacturing process, as shown in FIG. 8, first electrodes 201, first conductive wires 203, second electrodes 403, and a plurality of conductive wire segments 301 are formed on a touch area 1, wherein each of conductive wire axes 30 is electrically connected with the first conductive wire 203 at a contact point by one of the conductive wire segments 301, wherein the first conductive wire 203 and the conductive wire segment 301 at the contact point are integrated into one.

Figure 9:
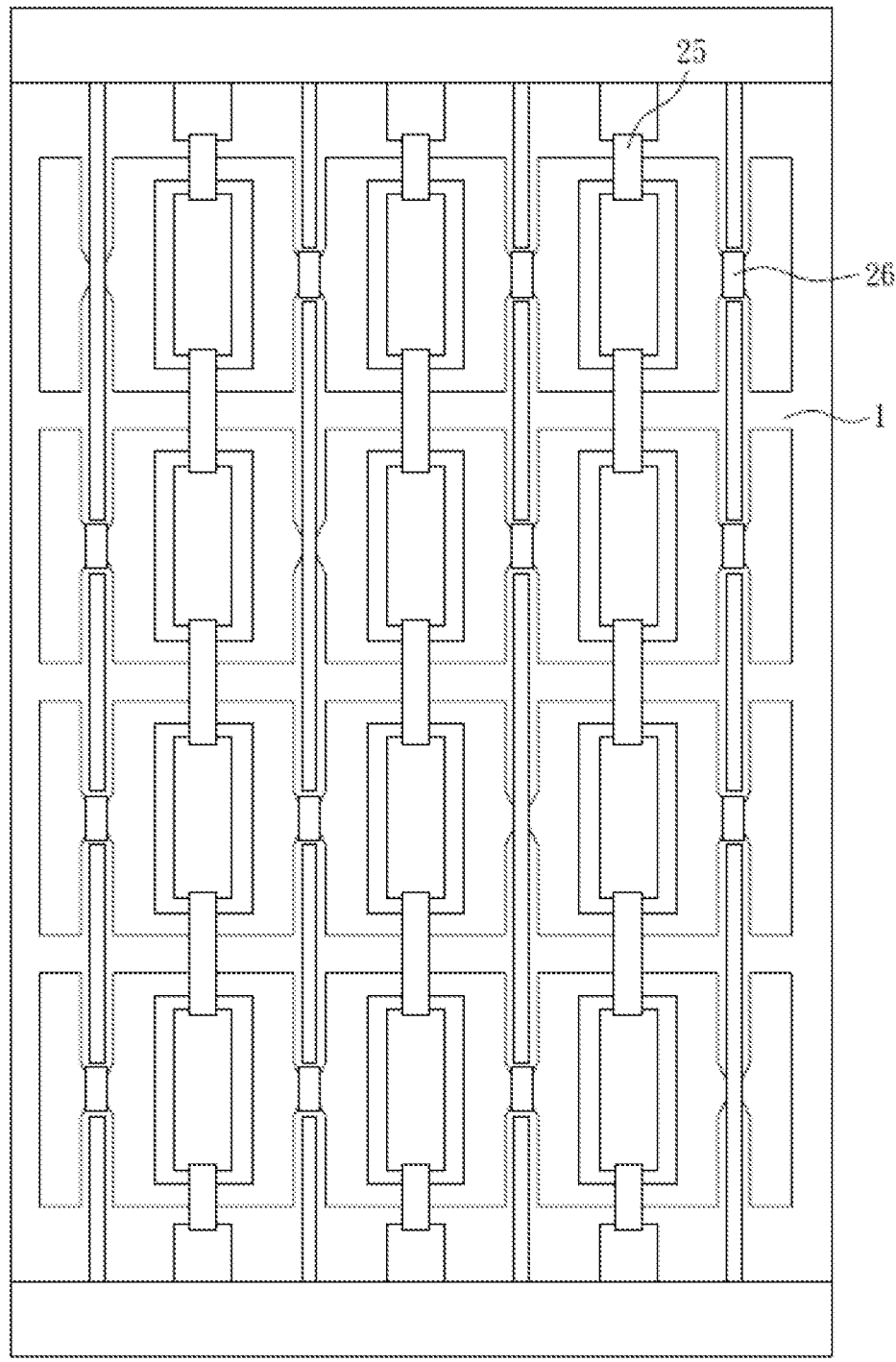

In a third manufacturing process, as shown in FIG. 9, a plurality of first insulation blocks 25 and second insulation blocks 26 are formed, wherein each of the first insulation blocks 25 is located between two adjacent second electrodes 401 and is disposed on the first electrodes 201 between two adjacent second electrodes 401. The second insulation blocks 26 are located on the first conductive wires 203 at the insulation points.

Figure 10:
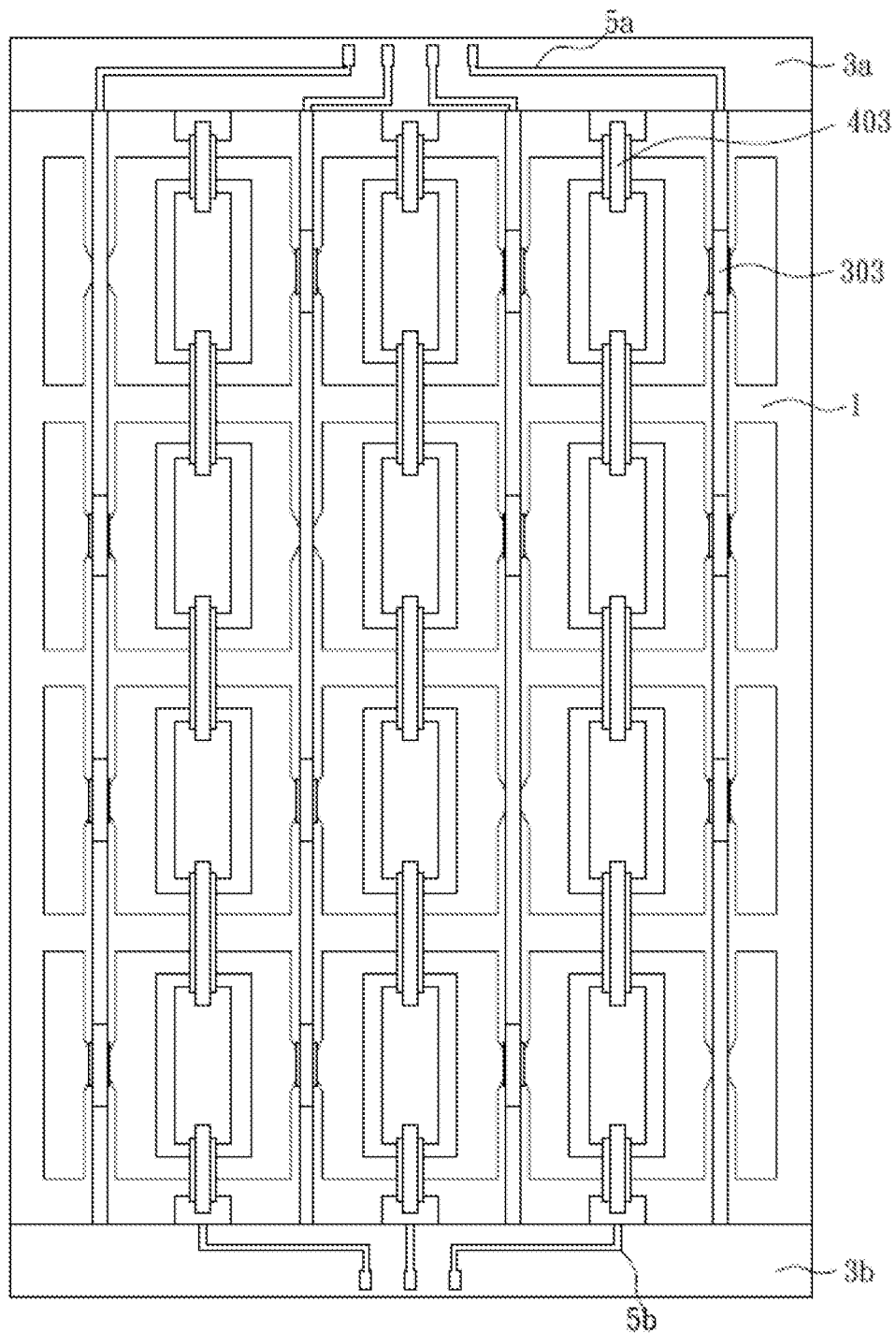

In a fourth manufacturing process, as shown in FIG. 10, second conductive wires 403 and third conductive wires 303 are formed. The second conductive wires 403 stretch across the first insulation blocks 25 and electrically connect the adjacent second electrodes 401. Thus, the first sensing electrode axes 20 and the second sensing electrode axes 40 are electrically insulated by the first insulation blocks 25. The third conductive wires 303 stretch across the second insulation blocks 26 and electrically connect the adjacent conductive wire segments 301. By the above manufacturing processes, each of the conductive wire axes 30 is electrically connected with only one of the plurality of first sensing electrode axes 20 and is electrically insulated from other fast sensing electrode axes 20.

In a fifth manufacturing process, first peripheral leads 5a are formed on the first peripheral area 3a, and second peripheral leads 5b are formed on the second peripheral area 3b, wherein the first peripheral leads 5a are electrically connected to the conductive wire axes 30, and wherein the second peripheral leads 5b are electrically connected to the second sensing electrode axes 40. If the second conductive wires 403, the third conductive wires 303, the first peripheral leads 5a, and the second peripheral leads 5b are made of a same material (such as metal), the step of forming the first peripheral leads 5a and the second peripheral leads 5b, and the step of forming the second conductive wires 403 and the third conductive wires 303 can be completed in a same manufacturing process.

Figure 11:
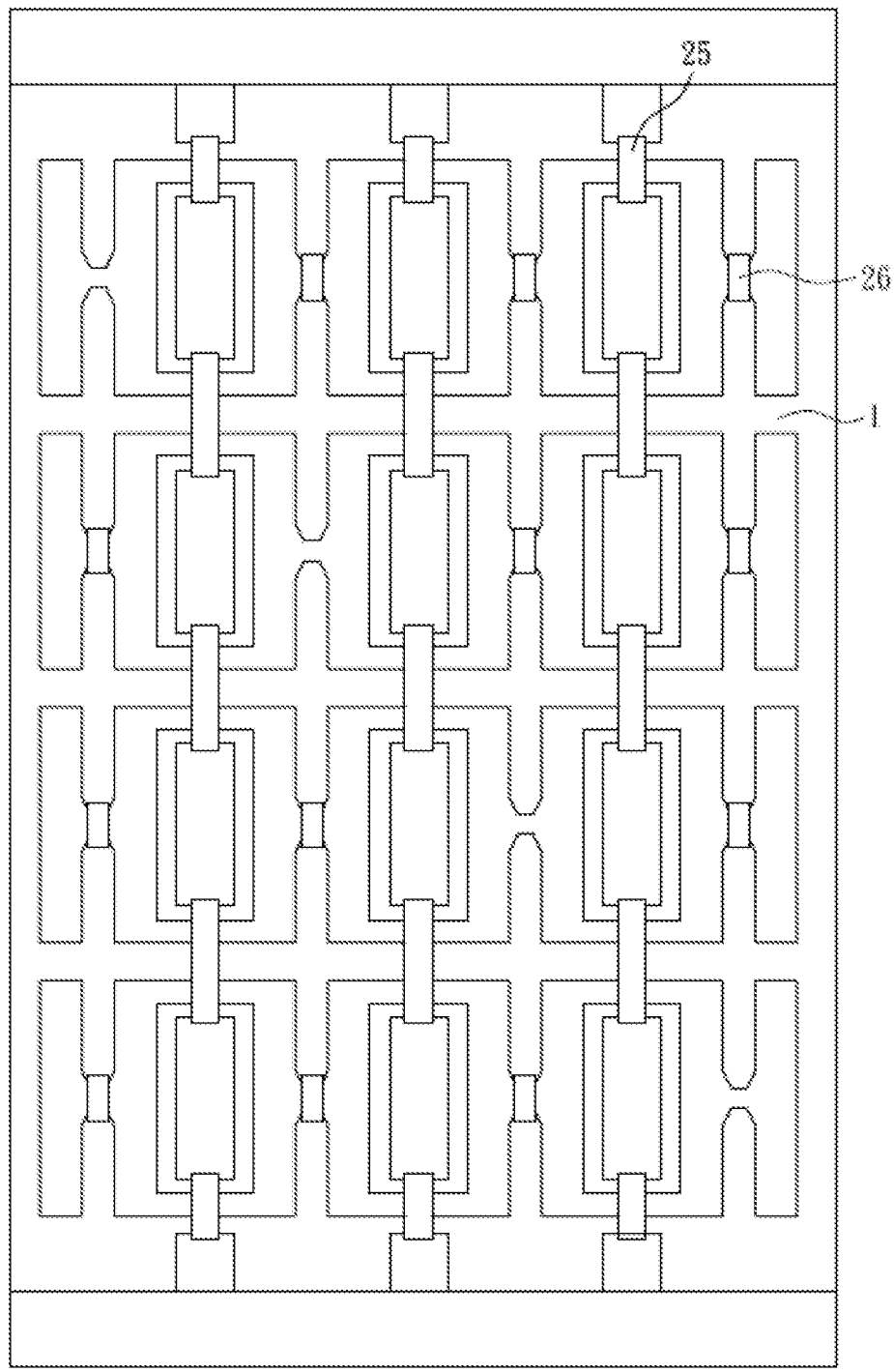
FIGS. 11~12 are schematic views illustrating a method for manufacturing a touch panel in accordance with a second embodiment of the present disclosure.
Figure 12:
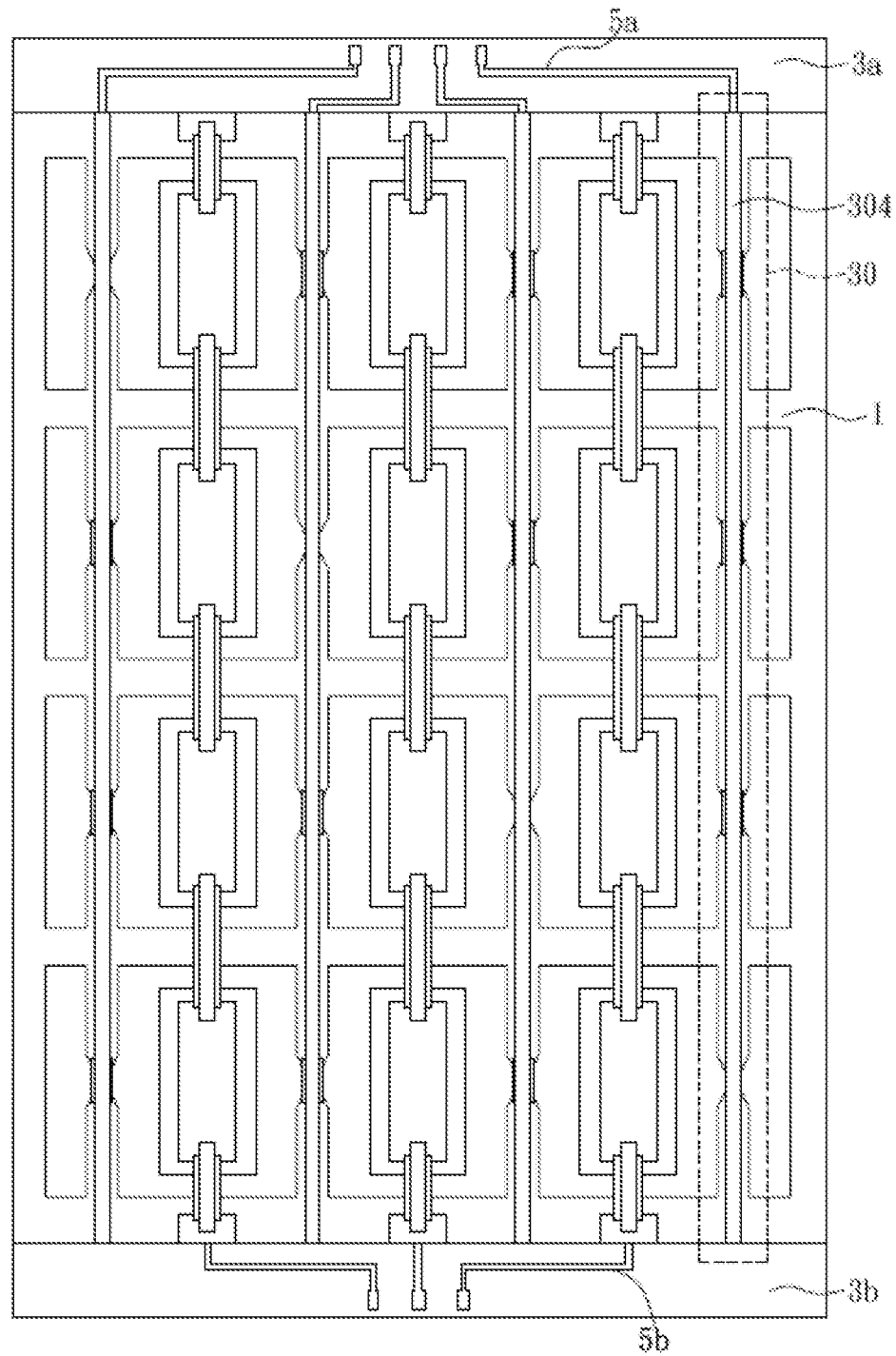

FIGS. 11~12 are schematic views illustrating a method for manufacturing a touch panel in accordance with a second embodiment of the present disclosure. The manufacturing method in the present embodiment is used to form the touch panel 100 shown in FIG. 3 correspondingly.

First manufacturing process of the present embodiment is approximately identical to the first manufacturing process of the first embodiment, as shown in FIG. 6. For conciseness, no more description is made herein.

In a second manufacturing process, as shown in FIG. 11, a plurality of first insulation blocks 25 and a plurality of second insulation blocks 26 are formed, wherein each of the first insulation blocks 25 is disposed on the first electrodes 201 between the adjacent second electrodes 401 and each of the second insulation blocks 26 is disposed on the first conductive wire 203 at an insulation point such that conductive wire axes 30 and first sensing electrode axes 20 to be formed subsequently are electrically connected only at contact points, and are electrically insulated by the second insulation blocks 26 at other intersections.

In a third manufacturing process, as shown in FIG. 12, a plurality of second conductive wires 403 and a plurality of continuous conductive wire axes 304 are formed. The second conductive wires 403 are located on the first insulation blocks 25 and are electrically connected to two adjacent second electrodes 401. The continuous conductive wire axes 304 are disposed along the second axis and are extended to a first peripheral area 3a and to a second peripheral area 3b. Each of the continuous conductive wire axes 304 is electrically connected with one of the first conductive wires 203 at a corresponding contact point.

In a fourth manufacturing process, first peripheral leads 5a are formed on the first peripheral area 3a and second peripheral leads 5b are formed on the second peripheral area 3b, wherein the first peripheral leads 5a are electrically connected to the conductive wire axes 30, and wherein the second peripheral leads 5b are electrically connected to the second sensing electrode axes 40. Similarly, if the second conductive wires 403, the conductive wire axes 30, the first peripheral leads 5a, and the second peripheral leads 5b are made of a same material (such as metal), the step of forming the first peripheral leads 5a and the second peripheral leads 5b and the step of forming the second conductive wires 403 and the conductive wire axes 30 can be completed in a same manufacturing process.

Figure 13:
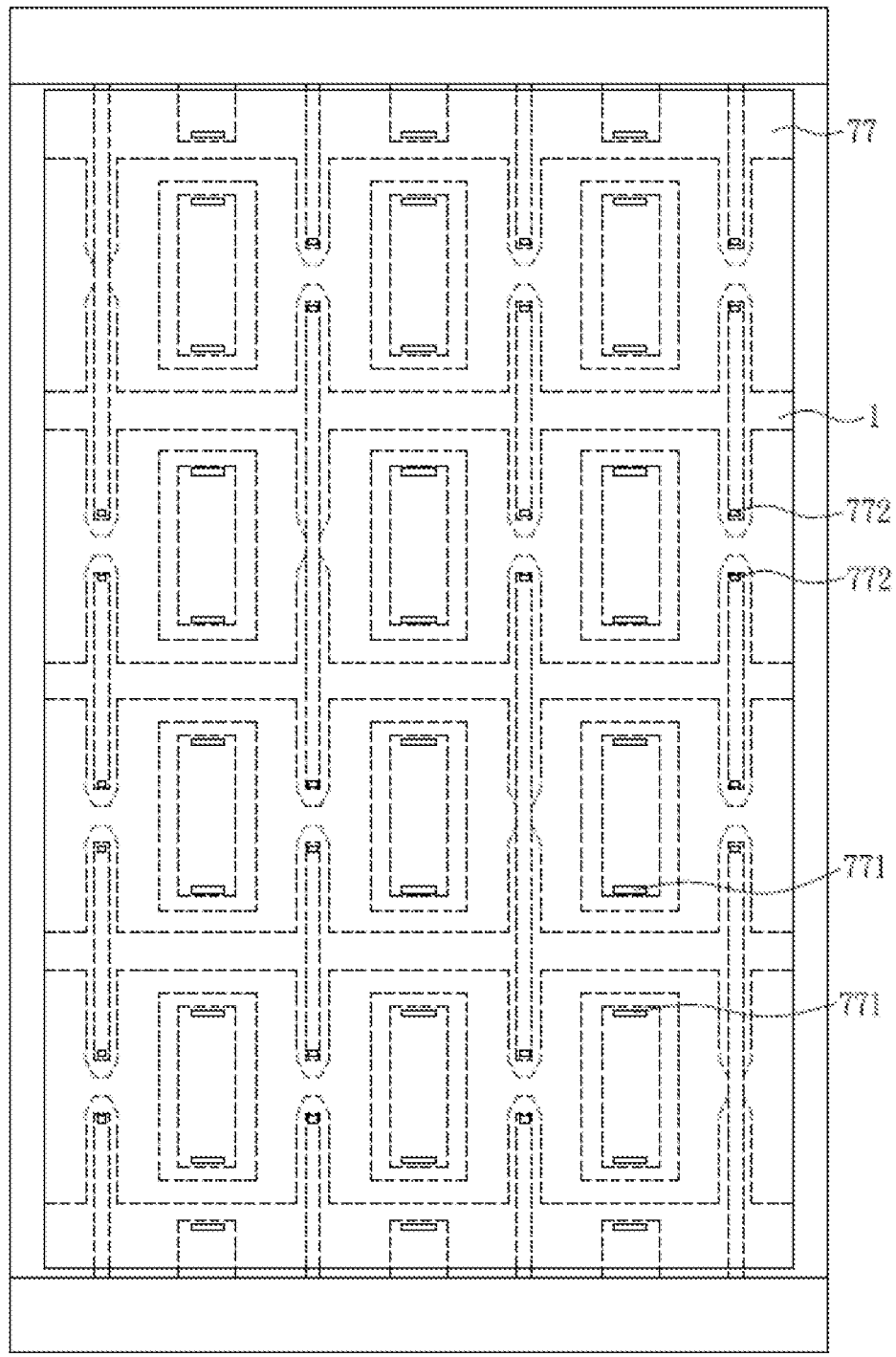
FIGS. 13~14 are schematic views illustrating a method for manufacturing a touch panel in accordance with a third embodiment of the present disclosure.
Figure 14:
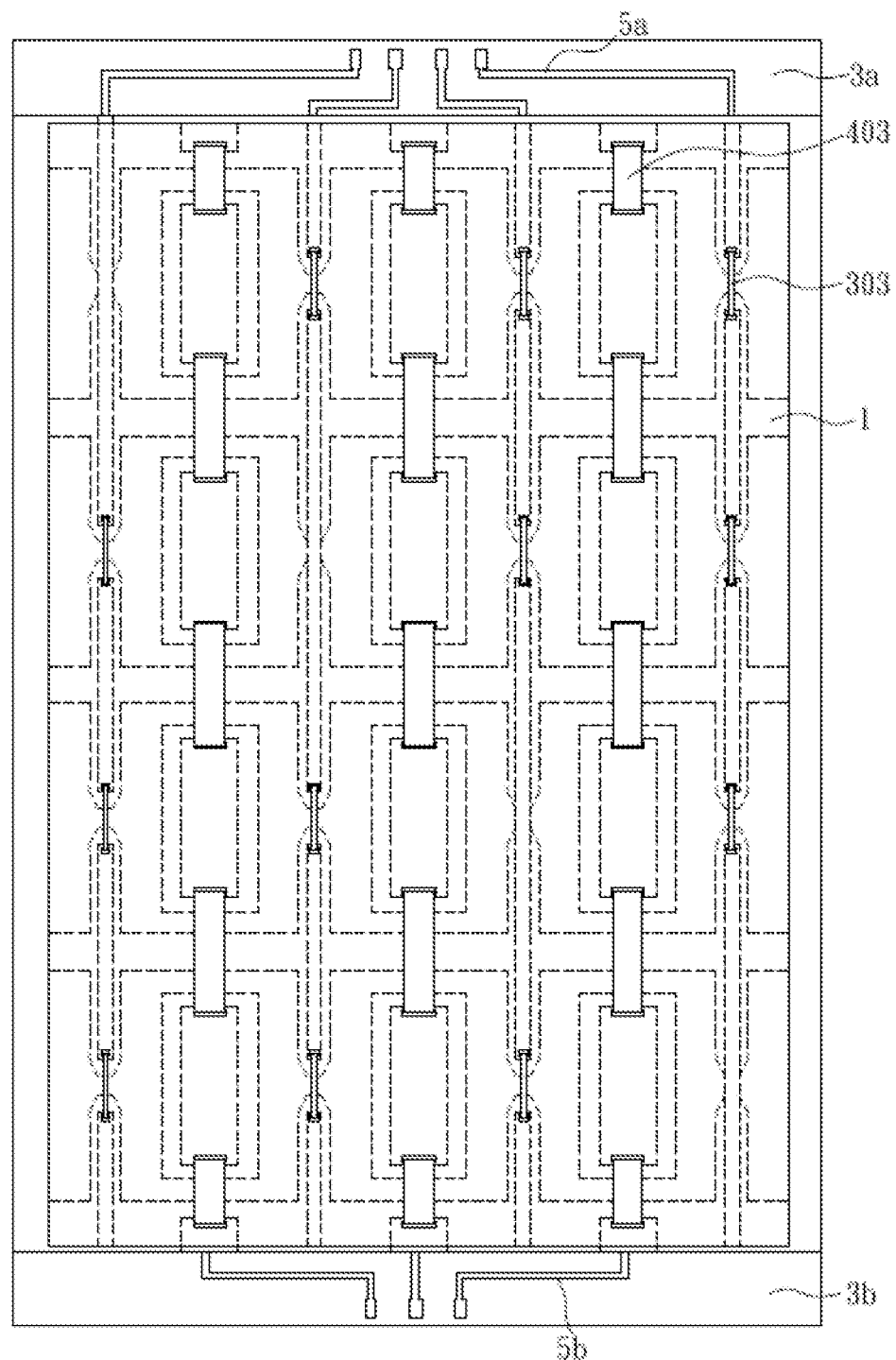

FIGS. 13~14 are schematic views illustrating a method for manufacturing a touch panel in accordance with a third embodiment of the present disclosure. The manufacturing method in the present embodiment is used to form the touch panel 100 shown in FIG. 4 correspondingly.

First and second manufacturing processes of the present embodiment are approximately identical to the first and second manufacturing processes of the first embodiment, as shown in FIG. 6 and FIG. 7. Thus, no more description is made herein.

Difference between the present embodiment and the first embodiment at least lies in that: as shown in FIG. 13, in a third manufacturing process, an insulation layer 77 is formed on the first electrodes 201, the first conductive wires 203, the second electrodes 401, and the conductive wire segments 301. There are a plurality of first through-holes 771 and a plurality of second through-holes 772 on the surface of the insulation layer 77, wherein the first through-holes 771 correspond to the second electrodes 401, and wherein the second through-holes 772 correspond to the conductive wire segments 301.

In a fourth manufacturing process, as shown in FIG. 14, second conductive wires 403 and third conductive wires 303 are formed on the surface of the insulation layer 77. Each of the second conductive wires 403 is disposed on the insulation layer 77 and passes through two adjacent first through-holes 771 to electrically connect the adjacent second electrodes 401. Each of the third conductive wires 303 is disposed on the insulation layer 77 and passes through two adjacent second through-holes 772 to electrically connect the adjacent conductive wire segments 301.

Fifth manufacturing process of the present embodiment is approximately identical to the fifth manufacturing process of the first embodiment. Thus, no more description is made herein.

A method for manufacturing a touch panel in accordance with a fourth embodiment is used to form the touch panel 100 shown in FIG. 5 correspondingly. Difference between the present embodiment and the first embodiment at least lies in that: conductive wire axes 30 designed in the present embodiment are different in length, for example, according to the arrangement order from left to right, the conductive wire axes 30 can be designed from short to long, wherein each of the conductive wire axes 30 and one of first sensing electrode axes 20 are electrically connected at one intersection as a contact point but are electrically insulated at other intersections as insulation points or do not intersect at all. Thus, in a second manufacturing process, conductive wire segments 301 only need to be extended from the contact points to a first peripheral area 3a at a first side of the touch panel, thereby being able to leave out the second peripheral area 3b required in the first embodiment so as to expand scope of the touch area and also being able to leave out the conductive wire segments 301 that are extended from the contact points to the second peripheral area 3b along the second axis and the corresponding third conductive wires 303 and second insulation blocks 26. Meanwhile, in a fifth manufacturing process, only first peripheral leads 5a are formed on the first peripheral area 3a, wherein the first peripheral leads 5a are electrically connected to the second sensing electrode axes 40 and to the conductive wire axes 30. There is no need to form second peripheral leads 5b. Other manufacturing processes of the present embodiment are approximately identical to those of the first embodiment. Thus, no more description is made herein. Alternatively, in another embodiment, in the second manufacturing process, the conductive wire segments 301 that are extended from the contact points to the second side of the touch panel along the second axis can be retained but the third conductive wires 303 that are extended from the contact points to the second side of the touch panel along the second axis and the corresponding second insulation blocks 26 are left out, thereby reducing difference of light reflectivity between the area disposed with electrodes and the area without electrodes and thus improving visual appearance of a product.

According to different touch input modes, the touch panels mentioned in the above embodiments can be classified into touch panels of resistive mode, capacitive mode or mixed mode integrating resistive mode or capacitive mode with optical mode, electromagnetic induction mode or acoustic-wave sensitive mode, wherein capacitive mode is a common touch panel technology in the market. Basic operation principle of a capacitive touch panel is: when a user touches a touch display screen by a finger or a stylus, a capacitance change generates at the position touched; according to the capacitance change, a touch location is detected, thereby achieving the propose of touch input.

To sum up, for the touch panels and manufacturing methods provided in the embodiments of the present disclosure, a plurality of conductive wire axes are used to lead out the peripheral leads of the first sensing electrode axes along the second axis and to lead out the peripheral leads of the second sensing electrode axes along the second axis such that the peripheral leads that connect the first sensing electrode axes and the peripheral leads that connect the second sensing electrode axes are concentrated in the first peripheral area and/or the second peripheral area. Particularly, the first peripheral area and the second peripheral area, delimited in the above embodiments, are generally shielding areas, upon which a trademark, an icon and other special patterns are formed originally. Thus, in the present disclosure, peripheral leads are disposed together in this common area, thereby reducing area of the peripheral area of the touch panel and effectively increasing areas of the available touch area and a visible area on the touch panel.

While certain embodiments have been shown and described, various modifications and substitutions may be made thereto without departing from the spirit and scope of the disclosure. Therefore, it is to be understood that the present disclosure has been described by way of illustration and not limitations.

What is claimed is:

1. A touch panel having a touch area and a peripheral area, wherein the touch panel comprises:
    a plurality of first sensing electrode axes disposed in the touch area along a first axis;
    a plurality of second sensing electrode axes disposed in the touch area along a second axis and electrically insulated from the first sensing electrode axes; and
    a plurality of conductive wire axes disposed in the touch area and extending to the peripheral area, wherein one of the conductive wire axes is disposed along the second axis between two adjacent second sensing electrode axes, wherein the one of the conductive wire axes is electrically isolated from the two adjacent second sensing electrode axes, wherein the one of the conductive wire axes intersects with the first sensing electrode axes, and wherein the one of the conductive wire axes and a second one of the conductive wire axes are electrically connected to different first sensing electrode axes.

2. The touch panel as claimed in claim 1, wherein the conductive wire axes and the first sensing electrode axes are arranged in a staggered manner.

3. The touch panel as claimed in claim 1, wherein the one of the conductive wire axes intersects with the first sensing electrode axes at a plurality of intersections, and wherein the one of the conductive wire axes is electrically connected to one of the first sensing electrode axes at one of the intersections as a contact point and electrically insulated from a rest of the first sensing electrode axes at a rest of the intersections as insulation points.

4. The touch panel as claimed in claim 1, wherein one of the first sensing electrode axes comprises a plurality of first electrodes, wherein the first electrodes are electrically connected by a plurality of first conductive wires, wherein one of the second sensing electrode axes comprises a plurality of second electrodes, and wherein the second electrodes are electrically connected by a plurality of second conductive wires.

5. The touch panel as claimed in claim 4, wherein each of the first electrodes has an opening, wherein one of the second electrodes is disposed in an opening of one of the first electrodes and electrically insulated from the one of the first electrodes, and wherein the one of the first electrodes surrounds the one of the second electrodes.

6. The touch panel as claimed in claim 5, wherein each of the conductive wire axes comprises a plurality of conductive wire segments, wherein the conductive wire segments are electrically connected by a plurality of third conductive wires, and wherein the one conductive wire axes is electrically connected with one of the first conductive wires at a contact point by one of the conductive wire segments.

7. The touch panel as claimed in claim 6, further comprising:
a plurality of first insulation blocks disposed between the first electrodes and the second conductive wires; and
a plurality of second insulation blocks disposed between the first conductive wires and the third conductive wires at insulation points.

8. The touch panel as claimed in claim 6, further comprising an insulation layer, wherein the insulation layer is disposed on the first electrodes, the first conductive wires, the second electrodes, and the conductive wire segments, wherein a plurality of first through-holes and a plurality of second through-holes are present on a surface of the insulation layer, wherein each of the second conductive wires is disposed on the insulation layer and passes through adjacent first through-holes to electrically connect adjacent second electrodes, and wherein each of the third conductive wires is disposed on the insulation layer and passes through adjacent second through-holes to electrically connect adjacent conductive wire segments.

9. The touch panel as claimed in claim 5, wherein the conductive wire axes are continuous conductive wire axes, and wherein each of the conductive wire axes is electrically connected with one of the first conductive wires at a corresponding contact point.

10. The touch panel as claimed in claim 9, further comprising:
a plurality of first insulation blocks disposed between the first electrodes and the second conductive wires; and
a plurality of second insulation blocks disposed between the continuous conductive wire axes and the first conductive wires at insulation points.

11. The touch panel as claimed in claim 1, wherein the one of the conductive wire axes and the first sensing electrode axes are arranged in a staggered manner, and wherein the one of the conductive wire axes is electrically connected to one of the first sensing electrode axes and electrically isolated from other of the first sensing electrode axes.

12. The touch panel as claimed in claim 1, wherein the peripheral area substantially consists of:
a first peripheral area and a second peripheral area, respectively located at two ends of the second sensing electrode axes, and
wherein the conductive wire axes extend to the first peripheral area.

13. The touch panel as claimed in claim 12, further comprising:
a plurality of first peripheral leads disposed on the first peripheral area and electrically connected to the conductive wire axes; and
a plurality of second peripheral leads disposed on the second peripheral area and electrically connected to the second sensing electrode axes.

14. The touch panel as claimed in claim 13, wherein sensing signals of the first sensing electrode axes are transmitted by the conductive wire axes and the first peripheral leads, and wherein sensing signals of the second sensing electrode axes are transmitted by the second peripheral leads.

15. The touch panel as claimed in claim 12, wherein two edges of the touch area are overlapped with two edges of the touch panel respectively in two opposite extension directions of the first axis.

16. The touch panel as claimed in claim 1, wherein the peripheral area substantially consists of a first peripheral area located adjacent to one end of the second sensing electrode axes, and wherein the conductive wire axes extend to the first peripheral area.

17. The touch panel as claimed in claim 16, further comprising:
a plurality of first peripheral leads disposed on the first peripheral area and electrically connected to the conductive wire axes and the second sensing electrode axes respectively.

18. The touch panel as claimed in claim 17, wherein sensing signals of the first sensing electrode axes are transmitted by the conductive wire axes and one part of the first peripheral leads, and wherein sensing signals of the second sensing electrode axes are transmitted by another part of the first peripheral leads.

19. A method for manufacturing a touch panel, wherein the touch panel has a touch area and a peripheral area, and wherein the method comprises the steps of:
forming a plurality of first sensing electrode axes and a plurality of second sensing electrode axes on the touch area, wherein the first sensing electrode axes are disposed along a first axis and the second sensing electrode axes are disposed along a second axis, and wherein the first sensing electrode axes are electrically insulated from the second sensing electrode axes; and
forming a plurality of conductive wire axes, wherein the conductive wire axes are disposed in the touch area and extend to the peripheral area, wherein one of the conductive wire axes is disposed along the second axis between two adjacent second sensing electrode axes, wherein the one of the conductive wire axes is electrically isolated from the two adjacent second sensing electrode axes, wherein the one of the conductive wire axes intersects with of the first sensing electrode axes, and wherein the one of the conductive wire axes and a second one of the conductive wire axes are electrically connected to different first sensing electrode axes.

20. The method for manufacturing the touch panel as claimed in claim 19, wherein there are a plurality of intersections between the conductive wire axes and the first sensing electrode axes, and wherein the one of the conductive wire axes and one of the first sensing electrode axes are electrically connected at one intersection as a contact point but are electrically insulated at other intersections as insulation points or do not intersect at all.

21. The method for manufacturing the touch panel as claimed in claim 20, wherein each of the first sensing electrode axes comprises a plurality of first electrodes, wherein the first electrodes are electrically connected by a plurality of first conductive wires, wherein each of the second sensing electrode axes comprises a plurality of second electrodes, wherein the second electrodes are electrically connected by a plurality of second conductive wires, wherein each of the first electrodes has an opening, wherein one of the second electrodes is disposed in an opening of one of the first electrodes and electrically insulated from the one of the first electrodes, and wherein the one of the first electrodes surrounds the one of the second electrodes.

22. The method for manufacturing the touch panel as claimed in claim 21, wherein each of the conductive wire axes comprises a plurality of conductive wire segments, wherein the conductive wire segments are electrically connected by a plurality of third conductive wires, and wherein the one of the conductive wire axes is electrically connected with one of the first conductive wires at the contact point by one of the conductive wire segments.

23. The method for manufacturing the touch panel as claimed in claim 22, further comprising the steps of:
forming the first electrodes, the first conductive wires, and the second electrodes on the touch area;
forming the conductive wire segments;
forming a plurality of first insulation blocks and a plurality of second insulation blocks, wherein each of the first insulation blocks is located on the first electrodes between adjacent second electrodes, and wherein each of the second insulation blocks is located on the first conductive wires at the insulation points; and
forming the second conductive wires and the third conductive wires, wherein the second conductive wires stretch across the first insulation blocks and electrically connect the adjacent second electrodes, and wherein the third conductive wires stretch across the second insulation blocks and electrically connect adjacent conductive wire segments.

24. The method for manufacturing the touch panel as claimed in claim 21, further comprising the steps of:
forming the first electrodes, the first conductive wires, and the second electrodes on the touch area;
forming a plurality of conductive wire segments, wherein the one of the conductive wire axes is electrically connected with one of the first conductive wires at the contact point by one of the conductive wire segments;
forming an insulation layer on the first electrodes, the first conductive wires, the second electrodes, and the conductive wire segments, wherein the insulation layer comprises of a plurality of first through-holes and a plurality of second through-holes; and
forming the second conductive wires and a plurality of third conductive wires, wherein each of the second conductive wires is disposed on the insulation layer and passes through adjacent first through-holes to electrically connect adjacent second electrodes, and wherein each of the third conductive wires is disposed on the insulation layer and passes through adjacent second through-holes to electrically connect adjacent conductive wire segments.

25. The method for manufacturing the touch panel as claimed in claim 21, further comprising the steps of:
forming the first electrodes, the first conductive wires, and the second electrodes on the touch area;
forming a plurality of first insulation blocks and a plurality of second insulation blocks, wherein each of the first insulation blocks is located on the first electrodes between adjacent second electrodes, and wherein each of the second insulation blocks is located on the first conductive wires at the insulation points; and
forming the second conductive wires and the conductive wire axes, wherein the second conductive wires stretch across the first insulation blocks and electrically connect the adjacent second electrodes, wherein the conductive wire axes are continuous conductive wire axes, and wherein each of the conductive wire axes is electrically connected with one of the first conductive wires at a corresponding contact point.

26. The method for manufacturing the touch panel as claimed in claim 19, wherein the peripheral area substantially consists of a first peripheral area and a second peripheral area respectively located at two ends of second sensing electrode axes, wherein the first peripheral area and the second peripheral area are in two opposite extension directions of the second axis, wherein the conductive wire axes are disposed in the touch area and extend to the first peripheral area, and wherein the method for manufacturing the touch panel further comprises the step of:
forming at least a first peripheral lead on the first peripheral area, wherein the first peripheral lead is electrically connected to the second sensing electrode axes and the conductive wire axes.

27. The method for manufacturing the touch panel as claimed in claim 19, wherein the peripheral area substantially consists of a first peripheral area and a second peripheral area respectively located at two ends of the second sensing electrode axes, wherein the first peripheral area and the second peripheral area are in two opposite extension directions of the second axis, wherein the conductive wire axes extend to the first peripheral area, and wherein the method for manufacturing the touch panel further comprises the steps of:
forming at least a first peripheral lead on the first peripheral area, wherein the first peripheral lead is electrically connected to the conductive wire axes; and
forming at least a second peripheral lead on the second peripheral area, wherein the second peripheral lead is electrically connected to the second sensing electrode axes.

* * * * *